(12) United States Patent
Suenaga et al.

(10) Patent No.: US 6,501,938 B1
(45) Date of Patent: Dec. 31, 2002

(54) SATELLITE BROADCASTING SYSTEM AND BROADCASTING SATELLITE

(75) Inventors: Masashi Suenaga, Zushi (JP); Yukiyoshi Fujimori, Yokohama (JP); Hideo Kikuchi, Kawaguchi (JP); Yoichi Koishi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/424,255

(22) PCT Filed: May 29, 1998

(86) PCT No.: PCT/JP98/02391

§ 371 (c)(1),
(2), (4) Date: Nov. 30, 1999

(87) PCT Pub. No.: WO98/54852

PCT Pub. Date: Dec. 3, 1998

(30) Foreign Application Priority Data

May 30, 1997 (JP) .............................. 9-141901

(51) Int. Cl.⁷ .............................. H04Q 7/20; H04H 1/00
(52) U.S. Cl. ....................... 455/3.02; 455/427; 455/12.1
(58) Field of Search ................ 455/12.1, 13.1, 455/13.3, 427, 20, 103, 3.02

(56) References Cited

U.S. PATENT DOCUMENTS 5,563,609 A * 10/1996 Wachs
5,754,942 A * 5/1998 Wachs ........................ 455/13.4
6,011,951 A * 1/2000 King et al.
6,023,242 A * 2/2000 Dixon
6,122,261 A * 9/2000 Fernandes et al.
6,434,384 B1 * 8/2002 Norin et al. ................ 455/429

FOREIGN PATENT DOCUMENTS

| JP | 50-2408 | 1/1975 |
| JP | 60-72335 | 4/1985 |
| JP | 2-131035 | 5/1990 |
| JP | 3-50923 | 3/1991 |
| JP | 4-192731 | 7/1992 |

* cited by examiner

Primary Examiner—Nguyen T. Vo
Assistant Examiner—Nghi H. Ly
(74) Attorney, Agent, or Firm—Oblon, Spivak, McClelland, Maier & Neustadt, P.C.

(57) ABSTRACT

In a broadcasting satellite, signals transmitted through an up transmission line of a Ka band, which includes a plurality of communication channels, are received by a Ka-band antenna. The signals received by the antenna are passed through band-pass filters to thereby extract a broadcasting signal transmitted through each communication channel. Those of the thus-extracted broadcasting signals, which have been transmitted through predetermined communication channels, are synthesized by each of synthesizers, then amplified by a corresponding one of high power amplifiers, and output to a corresponding one of a plurality of primary radiators employed in an S-band antenna. The S-band antenna transmits each synthesized signal to a predetermined area that corresponds to a corresponding primary radiator. Thus, the system can be made to a simple structure, and the service area can be changed for each broadcasting signal.

15 Claims, 7 Drawing Sheets

CENTE-OF-GRAVITY OF EARTH

SATELLITE BROADCASTING SYSTEM AND BROADCASTING SATELLITE

DISCUSSION OF THE BACKGROUND

1. Field of the Invention

This invention relates to a satellite broadcasting system for providing broadcasting of images, voices, data, etc., using a broadcasting satellite located in a stationary orbit above the equator, and also to the broadcasting satellite used for the satellite broadcasting.

2. Discussion of the Background

In accordance with the demand for various kinds of broadcasting services and with the development of communication techniques, satellite broadcasting has been started in addition to ground broadcasting. Since satellite broadcasting can provide services in a wide area without establishing a large-scale infrastructure, attention is now paid to it as a medium that can satisfy many needs.

At present in Japan, BS (Broadcasting Satellite) broadcasting and CS (Communication Satellite) broadcasting are now put to practical use, and the use of digital broadcasting has been started. Also in foreign countries, a satellite broadcasting system of substantially the same scale as in Japan has been developed and put to practical use.

In the satellite broadcasting systems used in both Japan and foreign countries, certain transmitting stations collect broadcasting signals of a plurality of channels and multiplex them before transmitting them to an up transmission line leading to the broadcasting satellite. The broadcasting satellite, in turn, converts the frequency of each signal input thereto via the up transmission line, to a value corresponding to a down transmission line to the ground, and performs power amplification of each signal, thereby transmitting each resultant signal to a predetermined service area. Thus, all broadcasting signals of a plurality of channels are transmitted to the predetermined service area. In other words, broadcasting is always performed only for a single service area.

Furthermore, a feeder link station is necessary for collecting broadcasting signals of a plurality of channels, and then transmitting them to the up transmission line. In the case of collecting broadcasting signals from a broadcasting station in a real-time manner, it is necessary to secure a ground transmission line between the broadcasting station and the feeder link station, which inevitably makes the system complicated.

SUMMARY OF THE INVENTION

As stated above, in the conventional satellite broadcasting system, a particular feeder link station concentrically performs signal transmission to a broadcasting satellite, and the broadcasting satellite itself only relays signals transmitted from the feeder link station. Accordingly, the system structure is complicated, and the service area is disadvantageously inflexible.

The present invention has been developed in light of the above, and is aimed at providing a satellite communication system of a simple structure capable of changing the service area for each of broadcasting signals, and also providing a broadcasting satellite that enables the satellite communication system.

To attain the aim, the invention provides a satellite broadcasting system that uses a broadcasting satellite located in a stationary orbit above the equator to provide a user with broadcasting from a plurality of transmitting stations such as broadcasting stations, characterized in that the broadcasting satellite comprises: a reception antenna such as a Ka-band antenna for receiving a signal transmitted via a predetermined up transmission line on which a plurality of communication channels are set; a transmission antenna such as an S-band antenna having a plurality of radiators for emitting transmission beams to a plurality of areas; channel separating means such as a band-pass filter for extracting, from the signal received by the reception antenna, a signal transmitted through each of the plurality of communication channels; and a plurality of signal processing means such as synthesizers, high power amplifiers, etc. provided corresponding to the plurality of radiators for each multiplexing and amplifying predetermined signals included in signals transmitted through the communication channels and extracted by the channel separating means, thereby outputting each signal to a corresponding one of the radiators, and characterized in that each of the plurality of transmitting stations transmits a broadcasting signal to the up transmission line via the one of the plurality of communication channels assigned to the each transmitting station, which corresponds to a desired broadcasting area.

By employing the above-described means, a signal transmitted to the broadcasting satellite via the up transmission line is received by the reception antenna and separated by the channel separating means into signals corresponding to communication channels that are set on the up transmission line. Those of the thus-separated signals corresponding to the communication channels, which correspond to predetermined communication channels, are multiplexed and amplified by signal processing means that correspond to a plurality of radiators incorporated in the transmitting antenna, and are then output to the radiators corresponding to the signal processing means. The radiators, in turn, emit the signals to areas defined by the transmission beams of the radiators. Accordingly, a broadcasting signal transmitted from each transmitting station is transmitted from a radiator corresponding to a communication channel which was used to transmit the broadcasting signal, to an area defined by the transmission beam of the radiator. In other words, the transmitting station can determine a broadcasting area by selecting a communication channel to be used to transmit a broadcasting signal.

Further, in the invention, the plurality of communication channels include communication channels that correspond to the respective radiators, and a communication channel corresponding to a plurality of ones of the radiators. When there exist a plurality of signals transmitted through a plurality of communication channels and corresponding to radiators, corresponding signal processing means multiplexes the signals.

By employing the above means, a signal transmitted to the broadcasting satellite through a communication channel that corresponds to a plurality of ones of the radiators is transmitted to a plurality of areas from the radiators corresponding to the communication channel. Thus, the broadcasting area is not limited to the area defined by the transmission beam of each radiator, but an area that is obtained by combining areas defined by the transmission beams of a plurality of radiators can be used as one broadcasting area unit, thereby enhancing the flexibility of use of the communication system.

In addition, in the invention, each of the transmitting stations constructed as above transmits a broadcasting signal obtained by spread spectrum modulation. Further, when a plurality of signals are transmitted to each radiator through corresponding communication channels, the signal processing means multiplexes the signals by synthesizing them.

Since signals obtained by spread spectrum modulation do not interfere with each other, synthesization performed by the signal processing means is relatively simple processing. That the signal processing means performs simple processing implies that the system structure can be simplified.

DESCRIPTION OF THE PREFERRED EMBODIMENTS

The embodiment of the invention will be described with reference to the accompanying drawings.

Figure 1:
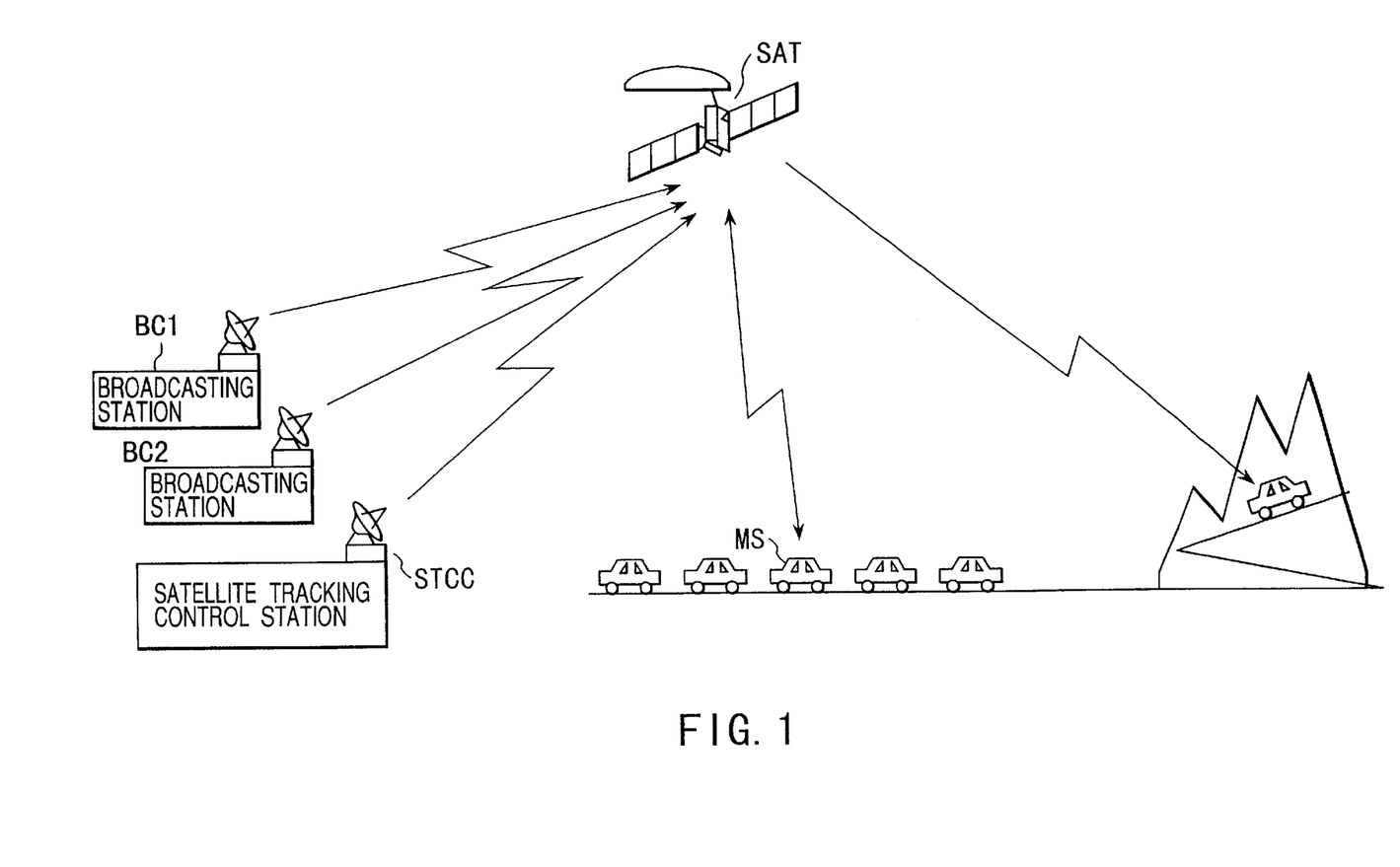
FIG. 1 is a schematic view illustrating a satellite broadcasting system according to the embodiment of the invention.

FIG. 1 is a schematic view illustrating a satellite broadcasting system according to the embodiment of the invention. The satellite broadcasting system includes a plurality of (two in this case) broadcasting stations BC1 and BC2 and a broadcasting satellite SAT. The broadcasting stations BC1 and BC2 transmit program signals created and edited by, for example, broadcasting enterprisers, to the broadcasting satellite SAT via an up transmission line of a Ka band. The broadcasting satellite SAT is managed by a satellite tracking control station STCC so that, for example, it will remain stationary at a predetermined location of a stationary orbit above the equator.

Figure 2:
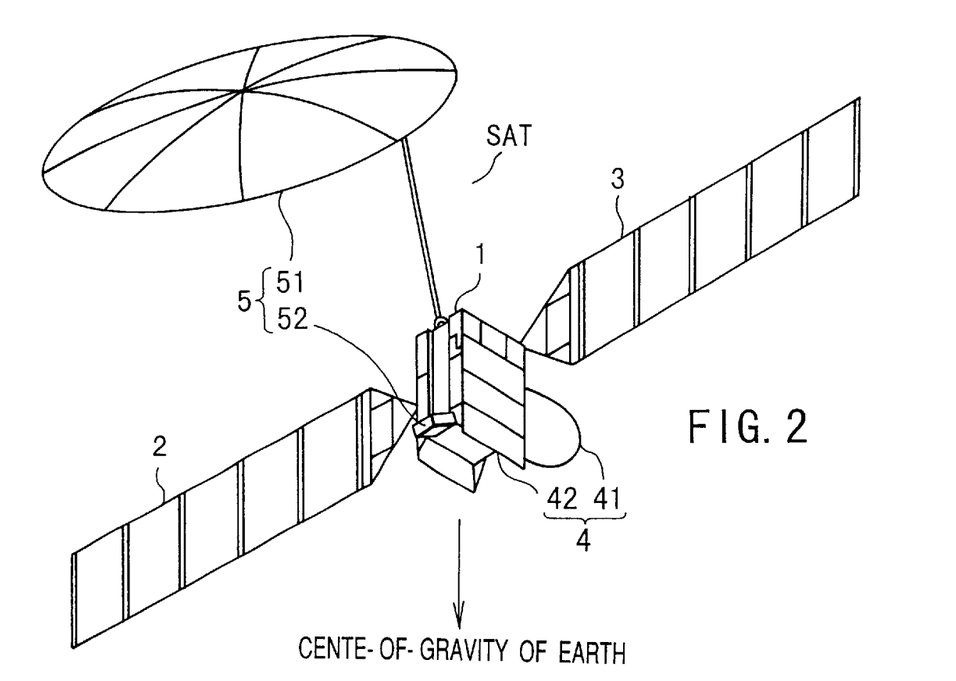
FIG. 2 is a perspective view illustrating the outward structure of a broadcasting satellite SAT appearing in FIG. 1.

The broadcasting satellite SAT is constructed, for example, as shown in FIG. 2. In FIG. 2, reference numeral 1 denotes a satellite main body. The satellite main body 1 has solar battery panels 2 and 3, a Ka-band antenna 4, and an S-band antenna 5 attached thereto. The Ka-band antenna 4 is formed of a reflection mirror 41 having a diameter of, for example, 2.5 m, and a primary radiator 42. The S-band antenna 5 is formed of a reflection mirror 51 having a diameter of, for example, 15 m, and a primary radiator group 52.

A broadcasting signal transmitted from each of the broadcasting stations BC1 and BC2 is received by the Ka-band antenna 4, then demodulated and amplified by a signal processing device (which will be described later) installed in the satellite main body 1, and converted into an S-band signal. The thus-converted broadcasting signal is transmitted from the S-band antenna 5 to a service area via an S-band down transmission line.

As is shown in FIG. 1 in the service area, a broadcasting signal from the broadcasting satellite SAT is received by a fixed station installed in an office or a home, or by a mobile station MS such as a receiving device installed in a car, a portable terminal device, etc.

In the S-band down transmission line, a plurality of (about 900 at maximum) channels of a transmission rate of, for example, 64–256 kbps/channel are multiplexed. Further, when transmitting an image signal via each channel, a MPEG 4 (Moving Picture Expert Group 4), for example, is used as an image encoding system.

Figure 3:
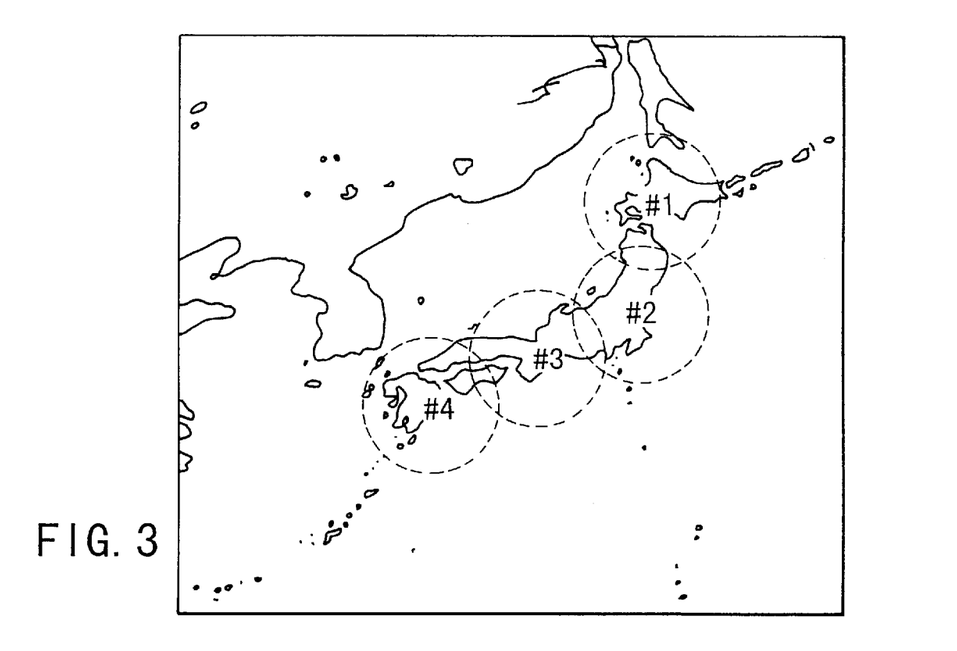
FIG. 3 is a view showing an example of a beam arrangement assumed when a service area is divided into four portions.

The primary radiator group 52 of the S-band antenna 5 has a plurality of (four in this embodiment) primary radiators for transmitting respective beams to divided portions (four portions in this embodiment) of the service area. FIG. 3 shows an example of a beam arrangement assumed when the service area is divided into four portions. In FIG. 3, reference numerals #1–#4 denote signal receiving areas defined by different transmission beams.

Figure 4:
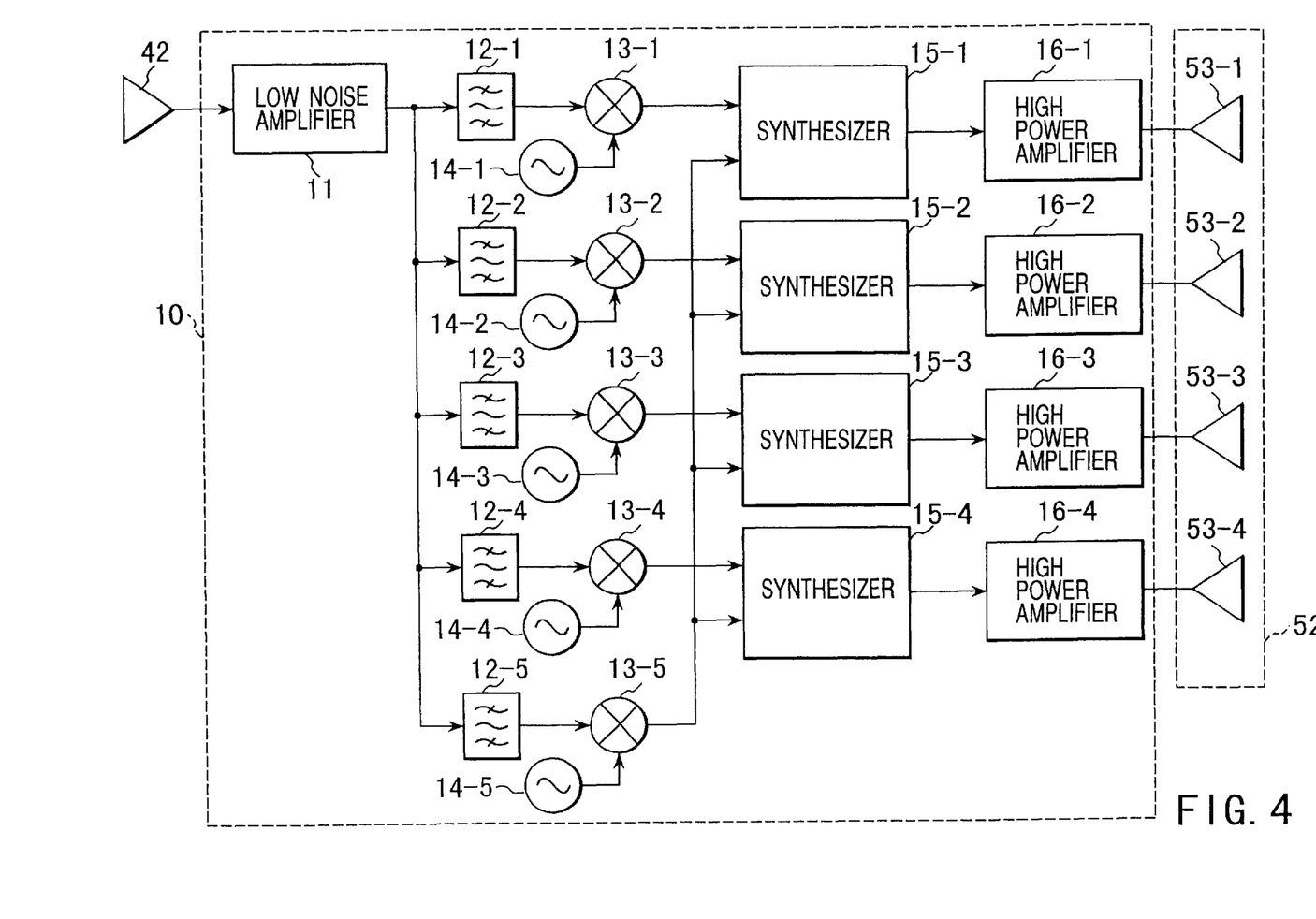
FIG. 4 is a block diagram illustrating the structure of a signal processing device installed in a satellite main body 1 appearing in FIG. 2.

FIG. 4 is a block diagram illustrating the structure of a signal processing device installed in the satellite main body 1. In FIG. 4, reference numeral 10 denotes the signal processing device, which comprises a low noise amplifier 11, five band-pass filters 12 (12-1–12-5), five mixers 13 (13-1–13-5), five oscillators 14 (14-1–14-5), four synthesizers 15 (15-1–15-4) and four high-output amplifiers 16 (16-1–16-4).

A broadcasting signal received by the Ka-band antenna 4 is supplied to the low noise amplifier 11, where it is amplified. The amplified signal is supplied to each of the band-pass filters 12-1–12-5.

The band-pass filter 12-1 passes therethrough a signal component with a band width of a predetermined central frequency f1 and ±B. The signal having passed through the band-pass filter 12-1 is mixed, by the mixer 13-1, with a signal with a frequency of (f1−fs) generated by the oscillator 14-1, thereby being converted into a signal with a central frequency of fs. This signal is supplied to the synthesizer 15-1.

A combination of the band-pass filter 12-2, the mixer 13-2 and the oscillator 14-2, a combination of the band-pass filter 12-3, the mixer 13-3 and the oscillator 14-3, and a combination of the band-pass filter 12-4, the mixer 13-4 and the oscillator 14-4 perform the same processing as in the combination of the band-pass filter 12-1, the mixer 13-1 and the oscillator 14-1, thereby converting a signal output from the low noise amplifier 11 into signals of the central frequency fs and then supplying the signals to the synthesizers 15-2–15-4, respectively. Similarly, in a combination of the band-pass filter 12-5, the mixer 13-5 and the oscillator 14-5, a signal output from the low noise amplifier 11 is converted, as in the combination of the band-pass filter 12-1, the mixer 13-1 and the oscillator 14-1, into a signal of the central frequency fs, which is then supplied to all the synthesizers 15-1–15-4.

However, it should be noted that the band-pass filters 12-2–12-5 each pass therethrough a signal component with a band width of a corresponding central frequency f2–f5 and ±B, which differs from the case of the band-pass filter 12-1. Further, the oscillators 14-2–14-5 each generate a signal with a frequency that is equal to the difference between the central frequency of a corresponding band-pass filter 12-2–12-5 and the frequency fs.

The synthesizers 15-1–15-4 each synthesize a signal output from a corresponding one of the mixers 13-1–13-4, with a signal output from the mixer 13-5. A synthesized signal output from each of the synthesizers 15-1–15-4 is amplified by a corresponding one of the high power amplifiers 16-1–16-4, and then supplied to corresponding one of four primary radiators 53-1–53-4 that constitute the primary radiator group 52 of the S-band antenna 5.

The operation of the satellite broadcasting system constructed as above will be described.

Suppose that the four primary radiators 53-1–53-4 that constitute the primary radiator group 52 of the S-band antenna 5 provide transmission beams for the signal receiving areas #1–#4 shown in FIG. 3. Also suppose that communication channels (hereinafter referred to as "first to fifth communication channels") having respective central frequencies f1–f5 are set on the up transmission line by frequency division. The first to fourth communication channels of the five communication channels correspond to the signal receiving areas #1–#4, respectively, and are set to serve as communication channels for transmitting broadcasting signals that limit respective broadcasting ranges of the areas #1–#4. The fifth communication channel is set to serve as a communication channel for transmitting a broadcasting signal that sets all the signal receiving areas #1–#4 (the entire service area) as a broadcasting range.

The satellite broadcasting system of the embodiment does not have a feeder link station for receiving a broadcasting signal from each broadcasting station BC1 or BC2, and transmitting it to the broadcasting satellite SAT. Instead, the broadcasting stations BC1 and BC2 individually transmit broadcasting signals to the up transmission line. Further, a communication channel used for the transmission of a broadcasting signal must correspond to the broadcasting range for which the broadcasting signal is to be transmitted. Moreover, a broadcasting signal to be transmitted by each broadcasting station BC1 or BC2 must be a signal obtained by spread spectrum modulation performed, at the signal receiving terminal side, using a diffusion sign that corresponds to a selection number (so-called a channel number) for the selection of the broadcasting signal.

Thus, broadcasting signals transmitted from the broadcasting stations BC1 and BC2 are received by the Ka-band antenna 4. The Ka-band antenna 4 actually receives a signal obtained by synthesizing the broadcasting signals from the broadcasting stations BC1 and BC2.

The signal received by the Ka-band antenna 4 is amplified by the low noise amplifier 11, then guided to the band-pass filters 12-1–12-5, where the signal is divided into broadcasting signals of respective communication channels (a plurality of broadcasting signals having different diffusion signs used for the spread spectrum modification). The broadcasting signals divided by the band-pass filters 12-1–12-5 are guided to the mixers 13 and the oscillators 14, where they are subjected to frequency conversion so that their respective central frequencies are unified to fs.

Subsequently, the broadcasting signals obtained, after the frequency conversion, through the first to fourth communication channels are synthesized by t he respective synthesizers 15 with a signal transmitted through the fifth communication channel.

The broadcasting signal obtained by synthesizing the broadcasting signal transmitted through the first communication channel, with the broadcasting signal transmitted through the fifth communication channel is supplied to the primary radiator 53-1 after it is amplified by the high power amplifier 16-1, and is transmitted to the signal receiving area #1 by the S-band antenna 5. The broadcasting signal obtained by synthesizing the broadcasting signal transmitted through the second communication channel, with the broadcasting signal transmitted through the fifth communication channel is supplied to the primary radiator 53-2 after it is amplified by the high power amplifier 16-2, and is transmitted to the signal receiving area #2 by the S-band antenna 5. The broadcasting signal obtained by synthesizing the broadcasting signal transmitted through the third communication channel, with the broadcasting signal transmitted through the fifth communication channel is supplied to the primary radiator 53-3 after it is amplified by the high power amplifier 16-3, and is transmitted to the signal receiving area #3 by the S-band antenna 5. The broadcasting signal obtained by synthesizing the broadcasting signal transmitted through the fourth communication channel, with the broadcasting signal transmitted through the fifth communication channel is supplied to the primary radiator 53-4 after it is amplified by the high power amplifier 16-4, and is transmitted to the signal receiving area #4 by the S-band antenna 5.

Figure 5:
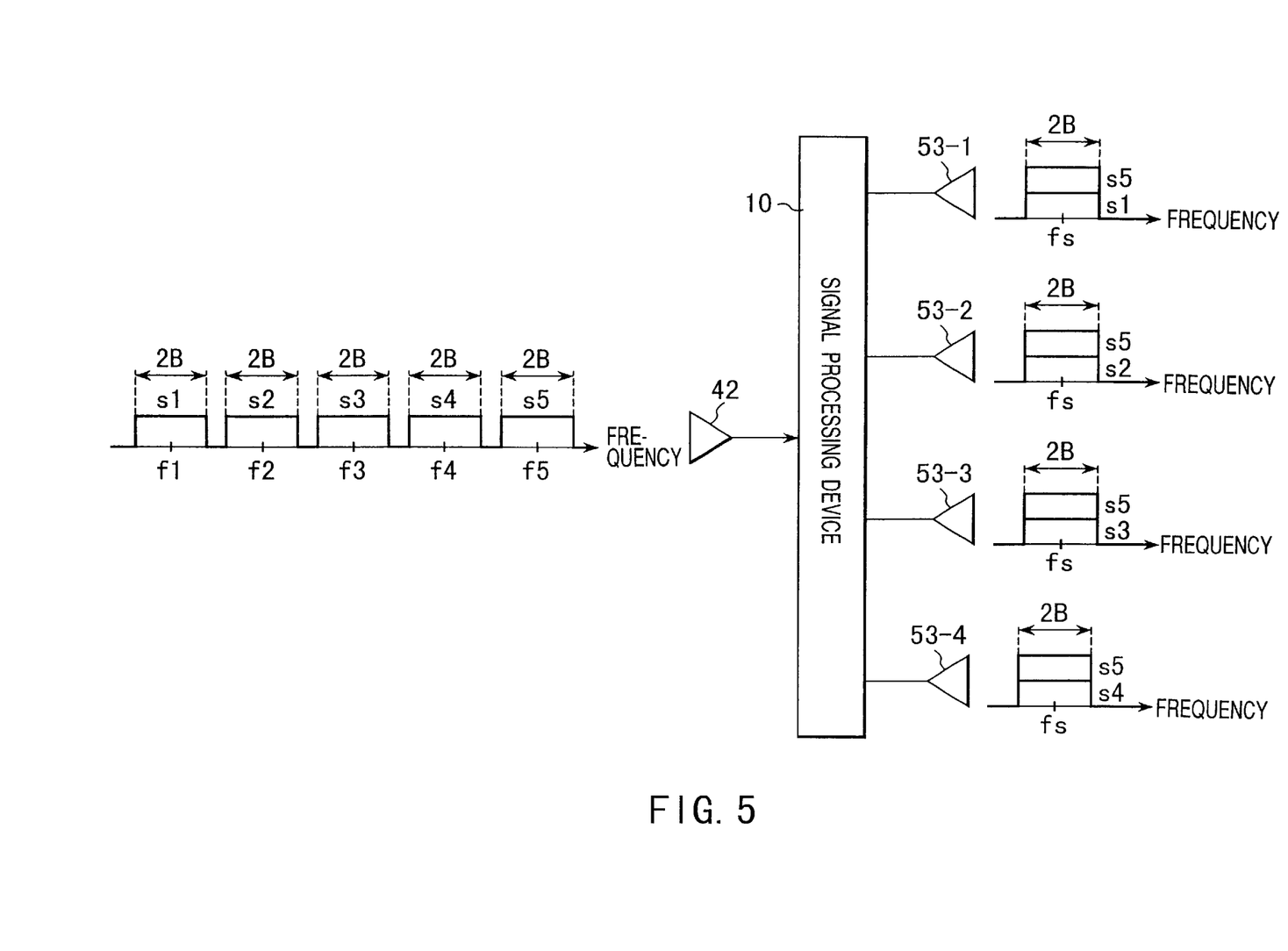
FIG. 5 is a view showing an example of the relationship between a signal transmitted to the broadcasting satellite SAT via an up transmission line, and a signal transmitted from the broadcasting satellite SAT.

Thus, where as shown in FIG. 5, each broadcasting signal s1–s5 is transmitted to the broadcasting satellite SAT through a corresponding one of the first to fifth communication channels, a broadcasting signal obtained by synthesizing the broadcasting signals s1 and s5 in the same frequency band (having the central frequency of fs) is transmitted from the primary radiator 53-1 to the signal receiving area #1. Similarly, a broadcasting signal obtained by synthesizing the broadcasting signals s2 and s5 in the same frequency band (having the central frequency of fs) is transmitted from the primary radiator 53-2 to the signal receiving area #2. Further, a broadcasting signal obtained by synthesizing the broadcasting signals s3 and s5 in the same frequency band (having the central frequency of fs) is transmitted from the primary radiator 53-3 to the signal receiving area #3. A broadcasting signal obtained by synthesizing the broadcasting signals s4 and s5 in the same frequency band (having the central frequency of fs) is transmitted from the primary radiator 53-4 to the signal receiving area #4.

Figure 6:
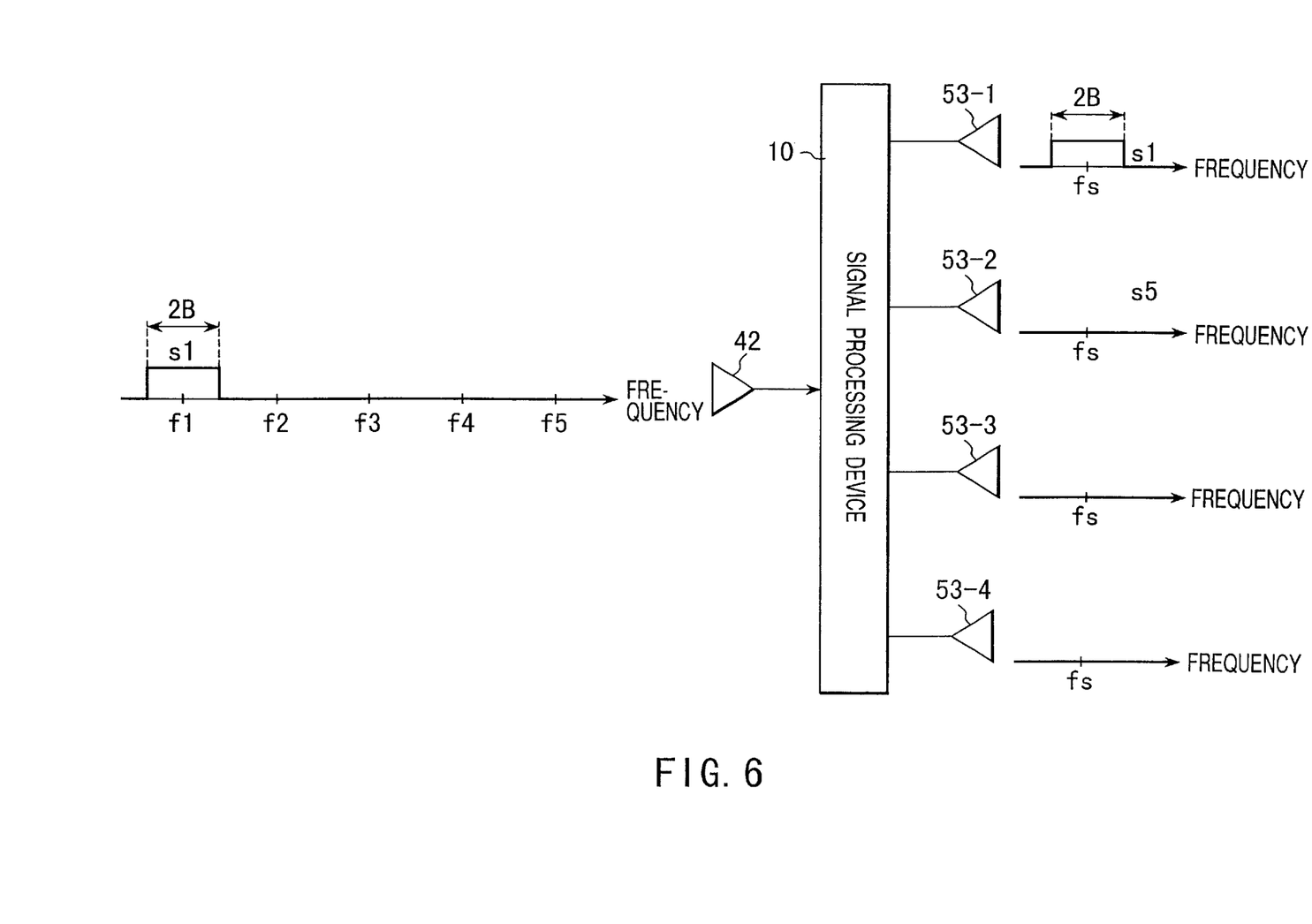
FIG. 6 is a view showing another example of the relationship between a signal transmitted to the broadcasting satellite SAT via the up transmission line, and a signal transmitted from the broadcasting satellite SAT.

On the other hand, where as shown in FIG. 6, only one broadcasting signal sl is transmitted only through the first communication channel to the broadcasting satellite SAT, a broadcasting signal corresponding to the broadcasting signal sl but having a frequency band with the central frequency of fs is transmitted from the primary radiator 53-1 of the broadcasting satellite SAT to the signal receiving area #1, whereas no signal is transmitted from the other primary radiators 53-2–53-4 to the areas #2–#4.

Figure 7:
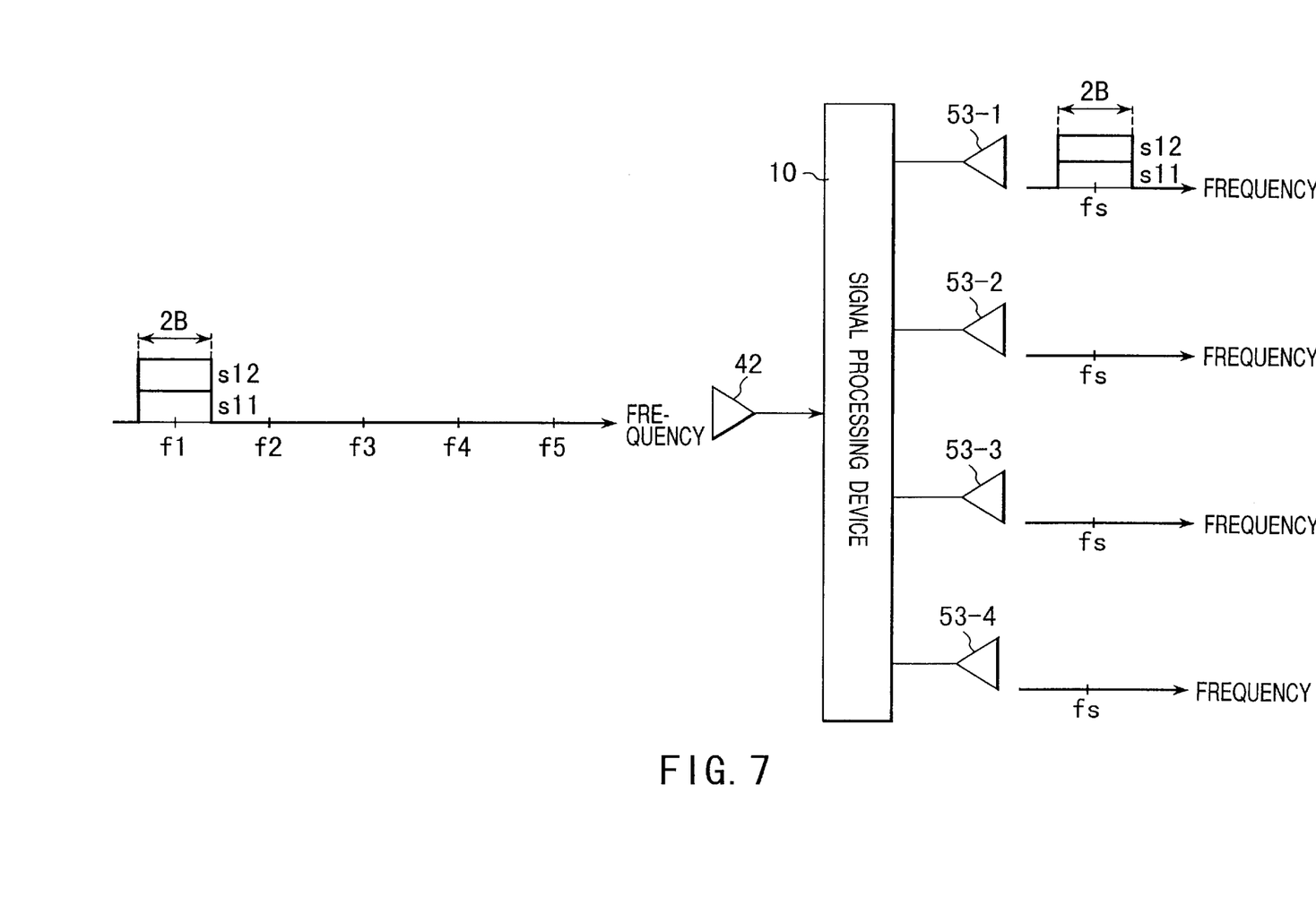
FIG. 7 is a view showing a further example of the relationship between a signal transmitted to the broadcasting satellite SAT via the up transmission line, and a signal transmitted from the broadcasting satellite SAT.

In addition, where as shown in FIG. 7, only two broadcasting signals s11 and s12 is transmitted only through the first communication channel to the broadcasting satellite SAT, broadcasting signals corresponding to the broadcasting signals s11 and s12 but having a frequency band with the central frequency of fs are transmitted from the primary radiator 53-1 of the broadcasting satellite SAT to the signal receiving area #1, whereas no signal is transmitted from the other primary radiators 53-2–53-4 to the areas #2–#4.

Figure 8:
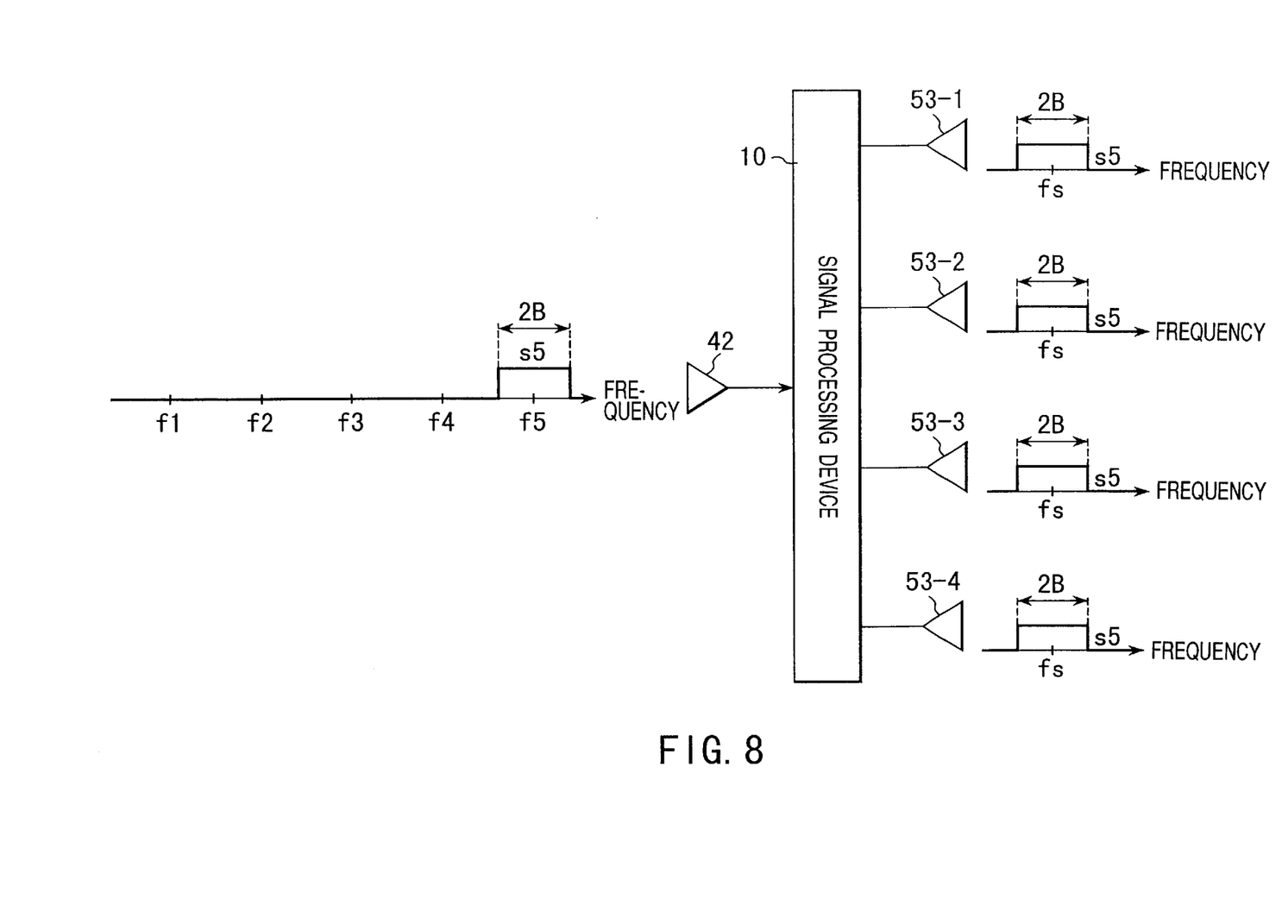
FIG. 8 is a view showing a yet another example of the relationship between a signal transmitted to the broadcasting satellite SAT via the up transmission line, and a signal transmitted from the broadcasting satellite SAT.

Furthermore, where as shown in FIG. 8, only one broadcasting signal s5 is transmitted only through the fifth communication channel to the broadcasting satellite SAT, a broadcasting signal corresponding to the broadcasting signal s5 but having a frequency band with the central frequency of fs is transmitted from the primary radiators 53-1–53-4 of the broadcasting satellite SAT to the signal receiving areas #1–#4.

As described above, in the embodiment, any broadcasting signal transmitted through the fifth communication channel from each of the broadcasting stations BC1 and BC2 is transmitted to all the signal receiving areas #1–#4. Accordingly, each broadcasting station BC1 or BC2 can use all the signal receiving areas #1–#4 (i.e. the entire service area) as the broadcasting range by using the fifth communication channel.

Also, a broadcasting signal transmitted through each of the first to fourth communication channels from each of the broadcasting stations BC1 and BC2 is transmitted only to a corresponding one of the signal receiving areas #1–#4. Accordingly, each broadcasting station BC1 or BC2 can use each of the signal receiving areas #1–#4 as the broadcasting range by using a corresponding one of the first to fourth communication channels.

Since each broadcasting station BC1 or BC2 can control the area to which a broadcasting signal is transmitted from the broadcasting satellite SAT, flexible use can be expected. Further, since neither a feeder link station nor a ground communication device is required, the system structure can be simplified.

As described above, each broadcasting signal is subjected, at the signal receiving terminal side, to spread spectrum modification using a diffusion sign that corresponds to a selection number (so-called a channel number) for the selection of the broadcasting signal. Therefore, even if different broadcasting signals directed to the same broadcasting range are simultaneously transmitted from one or both of the broadcasting stations BC1 and BC2, they are prevented from interfering with each other and can be received correctly by a signal receiving terminal. Moreover, even when the broadcasting satellite SAT has a plurality of broadcasting signals to be transmitted to one signal receiving area, the processing of each synthesizer 15 is relatively simple since the broadcasting signals are spread-spectrum modified and hence prevented from interfering with each other. As a result, the synthesizers 15 can have a simple structure.

The present invention is not limited to the above-described embodiment. Although, for example, no feeder link station is employed in the embodiment, each of the broadcasting stations BC1 and BC2 may have a function for collecting broadcasting signals transmitted from, for example, other broadcasting stations that have no satellite communication equipments, and transmitting them.

Yet further, although in the embodiment, the communication channels set on the up transmission line are made to correspond to the signal receiving areas #1–#4, respectively, or to all of the signal receiving areas #1–#4, any other correspondence may be optionally employed. For example, if a communication channel corresponding to both the signal receiving areas #1 and #2, and a communication channel corresponding to both the signal receiving areas #3 and #4 are set, broadcasting ranges such as "East Japan" and "West Japan" can be selected.

Although in the embodiment, two broadcasting stations are provided and the service area is divided into four signal receiving areas, the number of broadcasting stations or the number of signal receiving areas is optional. The shape of each signal receiving area is not limited to that shown in FIG. 3, but may be modified optionally.

Although in the embodiment, the communication channels on the up transmission line are set by frequency division, they may be set by time division or any other multiplex method.

Furthermore, although in the embodiment, the down transmission line transmits a multiplex signal obtained by CDM (Code Division Multiplex), another multiplex method such as OFDM (Orthogonal Frequency Division Multiplex), TDM (Time Division Multiplex), etc. may be used to create the multiplex signal. When changing the multiplex method used on the down transmission line, it is desirable that the format of a signal transmitted through the up transmission line should be made to correspond to the multiplex method employed on the down transmission line. In other words, a signal transmitted by a broadcasting station through the up transmission line is not limited to the signal obtained by spread spectrum modification.

The present invention can be modified in various manners without departing from its scope.

As described above, the present invention provides a satellite broadcasting system that uses a broadcasting satellite located in a stationary orbit above the equator to provide a user with broadcasting signals transmitted from a plurality of transmitting stations, characterized in that the broadcasting satellite comprises: a reception antenna for receiving a signal transmitted via an up transmission line that includes a plurality of communication channels; a transmission antenna having a plurality of radiators for emitting transmission beams to a plurality of areas; channel separating means for extracting, from signals received by the reception antenna, a signal transmitted through each of the plurality of communication channels; and a plurality of signal processing means provided corresponding to the plurality of radiators for taking those signals included in signals transmitted through the communication channels and extracted by the channel separating means, which correspond to communication channels assigned in advance to the plurality of signal processing means, thereby amplifying and outputting the taken signals to the plurality of radiators, and characterized in that each of the plurality of transmitting stations transmits a broadcasting signal to the up transmission line via the one of the plurality of communication channels assigned to said each transmitting station, which corresponds to a desired broadcasting area. By virtue of this design, the system can be made to a simple structure, and the service area can be changed for each broadcasting signal.

What is claimed is:

1. A satellite broadcasting system comprising:
   a broadcasting satellite to provide a user with broadcasting signals transmitted from a plurality of transmitting stations, the broadcasting satellite including,
   a reception antenna for receiving a signal transmitted via an up transmission line that includes a plurality of channels,
   signal extracting means for extracting, from the signal received by the reception antenna, signals transmitted through the respective channels,
   a transmission antenna having a plurality of radiators respectively directed to different broadcasting areas to form a plurality of transmission beams,
   a plurality of signal processing means provided corresponding to the plurality of radiators for each taking a signal transmitted thereto, thereby amplifying it and outputting it to a corresponding one of the radiators, and
   signal distribution means for recognizing broadcasting areas designated by the signals of the plurality of channels extracted by the signal extracting means, and distributing them to the respective signal processing means in response to the recognized broadcasting areas; and each of the plurality of transmitting stations selects one of the plurality of the channels, and transmits a broadcasting signal to the up transmission line with a broadcasting area designated.

2. A satellite broadcasting system according to claim 1, wherein when the signal distribution means distributes signals of a plurality of channels, each of the plurality of signal processing means multiplexes the signals and outputs a multiplexing result to a corresponding one of the radiators.

3. A satellite broadcasting system according to claim 1, wherein each of the plurality of transmitting stations transmits a broadcasting signal obtained by spread spectrum modulation, and when the signal distribution means distributes signals of a plurality of channels to each of the plurality of signal processing means, said each of the plurality of signal processing means synthesizes the signals, thereby performing multiplexing.

4. A satellite broadcasting system according to claim 2, wherein each of the plurality of transmitting stations transmits a broadcasting signal obtained by spread spectrum modulation, and when the signal distribution means distributes signals of a plurality of channels to each of the plurality of signal processing means, said each of the plurality of signal processing means synthesizes the signals, thereby performing multiplexing.

5. A satellite broadcasting system according to claim 1, wherein the signal distribution means uses the plurality of channels as designation information for respective broadcasting areas, recognizes a designated broadcasting area on the basis of each channel from which a corresponding signal is extracted, and distributes the signal to a corresponding one of the signal processing means, each of the plurality of transmitting stations selecting a channel corresponding to a desired broadcasting area, and transmitting a broadcasting signal.

6. A satellite broadcasting system according to claim 2, wherein the signal distribution means uses the plurality of channels as designation information for respective broadcasting areas, recognizes a designated broadcasting area on the basis of each channel from which a corresponding signal is extracted, and distributes the signal to a corresponding one of the signal processing means, each of the plurality of transmitting stations selecting a channel corresponding to a desired broadcasting area, and transmitting a broadcasting signal.

7. A satellite broadcasting system according to claim 3, wherein the signal distribution means uses the plurality of channels as designation information for respective broadcasting areas, recognizes a designated broadcasting area on the basis of each channel from which a corresponding signal is extracted, and distributes the signal to a corresponding one of the signal processing means, each of the plurality of transmitting stations selecting a channel corresponding to a desired broadcasting area, and transmitting a broadcasting signal.

8. A broadcasting satellite comprising:

a reception antenna for receiving a signal transmitted via an up transmission line that includes a plurality of communication channels;

signal extracting means for extracting, from the signal received by the reception antenna, signals transmitted through the respective channels;

a transmission antenna having a plurality of radiators respectively directed to different areas to form a plurality of transmission beams;

a plurality of signal processing means provided corresponding to the plurality of radiators for each taking a signal transmitted thereto, thereby amplifying it and outputting it to a corresponding one of the radiators; and signal distribution means for recognizing broadcasting areas designated by the signals of the plurality of channels extracted by the signal extracting means, and distributing them to the respective signal processing means in response to the recognized broadcasting areas.

9. A broadcasting satellite according to claim 8, wherein when the signal distribution means distributes signals of a plurality of channels to each of the plurality of signal processing means, each of the plurality of signal processing means multiplexes the signals and outputs a multiplexing result to a corresponding one of the radiators.

10. A broadcasting satellite according to claim 8, wherein when any one of the signals transmitted through the plurality of channels is obtained by spread spectrum modulation, and the signal distribution means distributes signals of a plurality of channels to each of the plurality of signal processing means, said each of the plurality of signal processing means synthesizes the signals, thereby performing multiplexing.

11. A broadcasting satellite according to claim 9, wherein when any one of the signals transmitted through the plurality of channels is obtained by spread spectrum modulation, and the signal distribution means distributes signals of a plurality of channels to each of the plurality of signal processing means, said each of the plurality of signal processing means synthesizes the signals, thereby performing multiplexing.

12. A satellite broadcasting system according to claim 8, wherein the signal distribution means uses the plurality of channels as designation information for respective broadcasting areas, recognizes a designated broadcasting area on the basis of each channel from which a corresponding signal is extracted, and distributes the signal to a corresponding one of the signal processing means.

13. A satellite broadcasting system according to claim 9, wherein the signal distribution means uses the plurality of channels as designation information for respective broadcasting areas, recognizes a designated broadcasting area on the basis of each channel from which a corresponding signal is extracted, and distributes the signal to a corresponding one of the signal processing means.

14. A satellite broadcasting system according to claim 10, wherein the signal distribution means uses the plurality of channels as designation information for respective broadcasting areas, recognizes a designated broadcasting area on the basis of each channel from which a corresponding signal is extracted, and distributes the signal to a corresponding one of the signal processing means.

15. A satellite broadcasting system according to claim 1, further comprising:

a reception terminal device positioned in one of the broadcasting areas and receiving a transmission signal transmitted from the broadcasting satellite and directed to said one of the broadcasting areas.

* * * * *